(12) United States Patent
Kim

(10) Patent No.: US 11,634,097 B2
(45) Date of Patent: Apr. 25, 2023

(54) APPARATUS FOR MOUNTING CURTAIN AIRBAG CUSHION

(71) Applicant: HYUNDAI MOBIS CO., LTD., Seoul (KR)

(72) Inventor: Ju Kyung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/681,981

(22) Filed: Feb. 28, 2022

(65) Prior Publication Data

US 2022/0297627 A1    Sep. 22, 2022

(30) Foreign Application Priority Data

Mar. 18, 2021 (KR) .................. 10-2021-0035266

(51) Int. Cl.
*B60R 21/201* (2011.01)
*B60R 21/213* (2011.01)
*B60R 21/232* (2011.01)

(52) U.S. Cl.
CPC .......... *B60R 21/201* (2013.01); *B60R 21/213* (2013.01); *B60R 21/232* (2013.01)

(58) Field of Classification Search
CPC .... B60R 21/201; B60R 21/213; B60R 21/232
See application file for complete search history.

(56) References Cited

U.S. PATENT DOCUMENTS

| 7,823,914 B2 * | 11/2010 | Cheal ................... | B60R 21/213 |
| | | | 280/730.2 |
| 7,980,585 B2 * | 7/2011 | Cheal ................... | B60R 21/201 |
| | | | 280/730.2 |
| 8,056,924 B2 * | 11/2011 | Hatfield ............... | B60R 21/213 |
| | | | 280/730.2 |
| 8,091,918 B2 * | 1/2012 | Mitchell .............. | B60R 21/201 |
| | | | 280/730.2 |
| 8,240,701 B2 * | 8/2012 | Cheal ................... | B60R 21/201 |
| | | | 280/730.2 |
| 9,487,175 B2 * | 11/2016 | Noma ................... | B60R 21/214 |
| 9,580,036 B2 * | 2/2017 | Choi ..................... | B60R 21/213 |

(Continued)

FOREIGN PATENT DOCUMENTS

KR    20030097137 A    12/2003

*Primary Examiner* — Laura Freedman
(74) *Attorney, Agent, or Firm* — NovoTechIP International PLLC

(57) ABSTRACT

An apparatus for mounting a curtain airbag cushion is proposed. The apparatus for mounting curtain airbag cushion includes an intermediate connection tap (200) and a strap (400) coupled to the curtain airbag cushion (1) by sewing (300), and a mounting plate (100) coupled to the intermediate connection tap (200) and securely coupled to a vehicle body (2). The mounting plate (100) is made of a steel material, thereby maintaining sufficient assembly torque when the mounting plate 100 is securely assembled to the vehicle body 2 by a medium of a bolt (500), and the intermediate connection tap (200) and the strap (400) coupled to the curtain airbag cushion (1) by sewing (300) are made of flexible fabric materials, thereby preventing the curtain airbag cushion (1) from being damaged by the intermediate connection tap (200) and the strap (400) in sewing 300.

7 Claims, 7 Drawing Sheets

(56) References Cited

U.S. PATENT DOCUMENTS

| | | | |
|---|---|---|---|
| 11,220,232 B2* | 1/2022 | Kim | B60R 21/217 |
| 2015/0102588 A1* | 4/2015 | Cheal | B60R 21/201 |
| | | | 29/428 |
| 2021/0253053 A1* | 8/2021 | Callewaert | B60R 21/20 |
| 2022/0355757 A1* | 11/2022 | Kim | B60R 21/232 |
| 2022/0371539 A1* | 11/2022 | Kim | B60R 21/232 |

* cited by examiner

APPARATUS FOR MOUNTING CURTAIN AIRBAG CUSHION

CROSS-REFERENCE TO RELATED APPLICATIONS

The present application claims priority to Korean Patent Application No. 10-2021-0035266, filed Mar. 18, 2021, the entire contents of which is incorporated herein for all purposes by this reference.

BACKGROUND

1. Technical Field

The present invention relates generally to an apparatus for mounting a curtain airbag cushion, the apparatus being used when the curtain airbag cushion in a folded state is securely coupled to a vehicle body. More particularly, the present invention relates to an apparatus for mounting a curtain airbag cushion, the apparatus being configured to maintain assembly torque in coupling between the apparatus and a vehicle body, and configured to prevent sagging to improve the assembly efficiency and workability of an operator.

2. Discussion of Related Art

In general, various types of airbag apparatuses are provided in vehicles to protect occupants when an accident occurs. Among the airbag apparatuses, a curtain airbag apparatus is mounted to a side panel of a vehicle body, and when a roll-over accident or a side collision of a vehicle occur, the curtain airbag apparatus is configured to protect an occupant while an airbag cushion is unfolded downward.

The curtain airbag apparatus generally has a curtain airbag cushion folded in a round rolled shape and mounted to an upper portion of a pillar part, and the curtain airbag cushion in the folded state is unfolded by a pressure of airbag gas generated from an inflator to protect the upper body of the occupant including the head.

FIG. 1 is a view showing a folded curtain airbag cushion in the round rolled shape in a mounted state to a vehicle body by a medium of a conventional mounting apparatus. FIG. 2 is a view showing the conventional mounting apparatus.

In other words, the round folded curtain airbag cushion 1 is coupled to a mounting tap 10 made of a flexible material by sewing 11, a rotation preventing clip 20 is coupled to the mounting tap 10 while penetrating the mounting tap 10, a push retainer is coupled to a rear portion of the mounting tap 10, and a bolt 30 is fastened to the vehicle body 2 after penetrating the rotation preventing clip 20 and the push retainer and then the mounting tap 10 is securely coupled to the vehicle body 2.

Furthermore, the round folded curtain airbag cushion 1 is surrounded by a strap 40 connected to the mounting tap 10, so that the folded curtain airbag cushion 1 is securely coupled to the vehicle body 2 by the strap 40, the mounting tap 10, and the bolt 30.

In the conventional mounting apparatus as described above, the mounting tap 10 is directly sewn with the round folded curtain airbag cushion 1, and in order to perform sewing with the curtain airbag cushion 1, the mounting tap 10 is made of a fabric material with a flexible characteristic, not a hard steel material or hard plastic material.

Furthermore, when the mounting tap 10 directly sewn with the curtain airbag cushion 1 is made of a hard steel or plastic material, there is a risk of damaging the curtain airbag cushion 1 in sewing with the curtain airbag cushion 1, and in order to prevent the problem, the mounting tap 10 is made of a flexible material.

However, the conventional mounting apparatus has a disadvantage such that it is difficult to maintain assembly torque when the mounting tap 10 made of a flexible fabric material is assembled with the vehicle body 2 by using the bolt 30, and when assembly torque is not maintained, a fastening force between the vehicle body 2 and the mounting tap 10 is week to cause a disadvantage in which the mounting tap 10 is easily separated from the vehicle body 2.

Furthermore, as the mounting tap 10 is made of a flexible fabric material, it is difficult to maintain the shape of the mounting tap 10 by weights of the rotation preventing clip 20 and the push retainer coupled to the mounting tap 10 and sagging occurs. Accordingly, when the mounting tap is assembled with the vehicle body 2 by using the bolt 30, assembly efficiency and workability are poor.

The foregoing described as the controller and the controlling method of operating a fuel cell is intended merely to aid in the understanding of the background of the present invention, and is not intended to mean that the present invention falls within the purview of the related art that is already known to those skilled in the art.

SUMMARY

Accordingly, the present invention has been made keeping in mind the above problem occurring in the related art, and the present invention is intended to provide an apparatus for mounting a curtain airbag cushion, the apparatus being used when a curtain airbag cushion in a folded state is securely coupled to a vehicle body, wherein the apparatus is configured to be connected to the curtain airbag cushion with a flexible material and to be assembled with a vehicle body with a hard material, and the present invention is intended to prevent the curtain airbag cushion from being damaged, to maintain assembly torque in coupling between the apparatus and the vehicle body, and to improve the assembly efficiency and workability by sagging prevention.

In order to achieve the above objective, according to one aspect of the present invention, there is provided an apparatus for mounting a curtain airbag cushion, the apparatus including: a mounting plate securely coupled to a vehicle body; an intermediate connection tap coupled to the mounting plate; and a strap wrapping the curtain airbag cushion in a folded state, the curtain airbag cushion being round rolled, in a circumferential direction of the curtain airbag cushion, and of which a first end may be sewn together with both the curtain airbag cushion and the intermediate connection tap and a second end may penetrate the mounting plate and be fixed by being caught by the intermediate connection tap.

The mounting plate may be securely coupled to the vehicle body by a medium of a bolt penetrating an upper end thereof; and in order to prevent sagging of the mounting plate caused by weights of the intermediate connection tap, the strap, and the curtain airbag cushion, the mounting plate may be made of a steel material.

The mounting plate may have a first through hole through which the strap may pass and a second through hole through which the intermediate connection tap may pass, the first through hole and the second through hole being arranged to be vertically spaced apart from each other.

The mounting plate may have one through hole provided for allowing both the intermediate connection tap and the strap to pass through the one through hole together.

The intermediate connection tap may be made of a flexible fabric material, and opposite ends of the mounting plate penetrating the second through hole overlap each other, and a lower portion of the second through hole may be sewn together with the curtain airbag cushion and the first end of the strap.

The strap may be made of a flexible fabric material, the first end of the strap may be inserted into a gap between the curtain airbag cushion and the intermediate connection tap and then sewn together with both the curtain airbag cushion and the intermediate connection tap, and the second end of the strap may wrap the curtain airbag cushion in the circumferential direction thereof and then penetrate the first through hole of the mounting plate and then be fixed by being caught by the intermediate connection tap.

A lower end of the intermediate connection tap may have a blocking part protruding toward opposite sides; and the second end of the strap may have a blocking hole such that the blocking part may be blocked and locked at the blocking hole.

As described above, the apparatus for mounting a curtain airbag cushion according to the present invention includes the intermediate connection tap sewn to the curtain airbag cushion, the strap, and the mounting plate coupled to the intermediate connection tap and securely coupled to the vehicle body. As the mounting plate is made of a steel material, it is possible to maintain sufficient assembly torque when the mounting plate is securely assembled to the vehicle body by a medium of the bolt. Accordingly, a coupling force between the mounting plate and the vehicle body can be strengthened, so that a problem that the curtain airbag cushion is separated from the vehicle body can be improved.

Furthermore, as the mounting plate is made of a steel material, the present invention has an advantage in which sagging the mounting plate generated by the weights of the intermediate connection tap, the strap, and the curtain airbag cushion can be prevented, and the shape maintenance of the mounting plate can be achieved, so that it is possible to improve the assembly efficiency and workability of the operator in assembly of the mounting plate to the vehicle body by using the bolt.

Furthermore, the intermediate connection tap and the strap are made of flexible fabric materials so as to be sewn with the curtain airbag cushion, so that the present invention has an advantage in which it is possible to prevent the curtain airbag cushion from being damaged by the intermediate connection tap and the strap in sewing.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION

Figure 1:
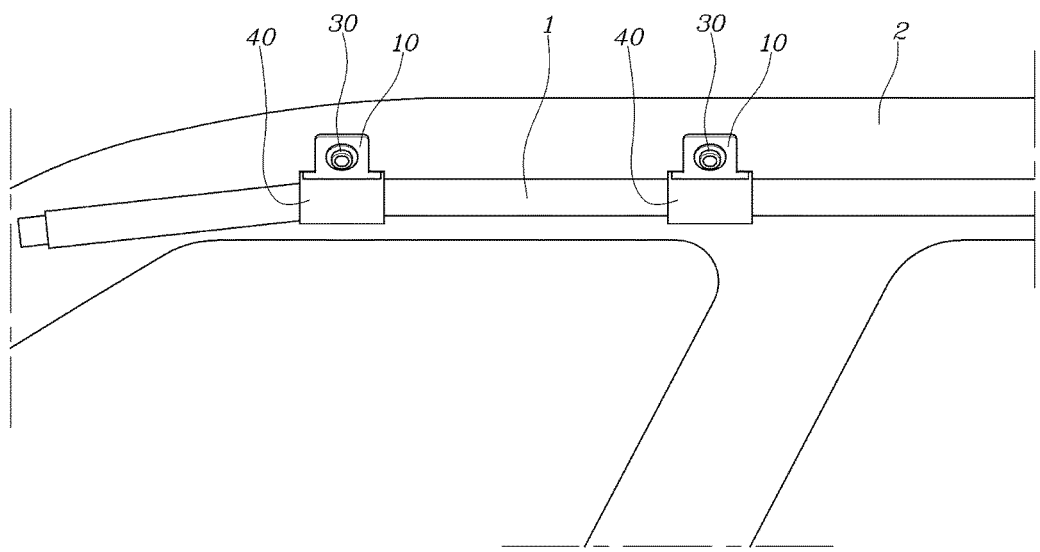
FIG. 1 is a view showing a folded curtain airbag cushion in a mounted state to a vehicle body by a medium of a conventional mounting apparatus.
Figure 2:
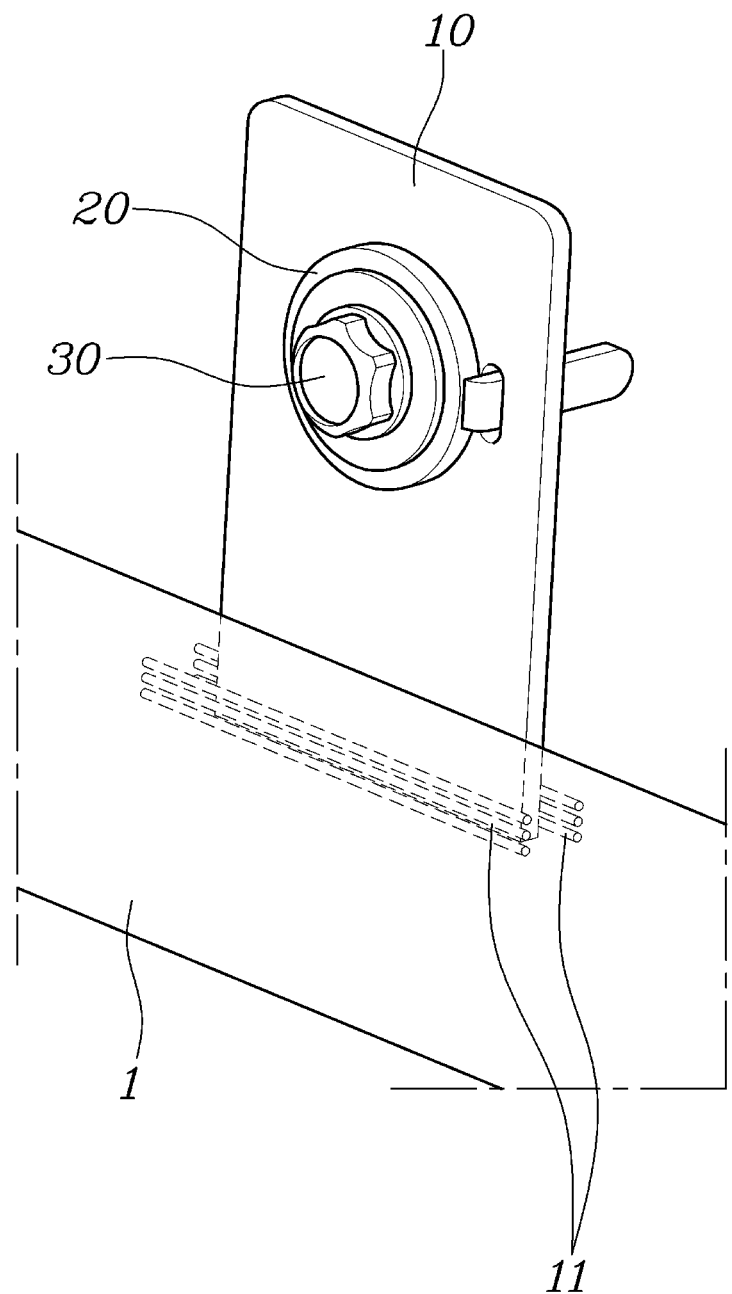
FIG. 2 is a view showing the conventional mounting apparatus.
Figure 3:
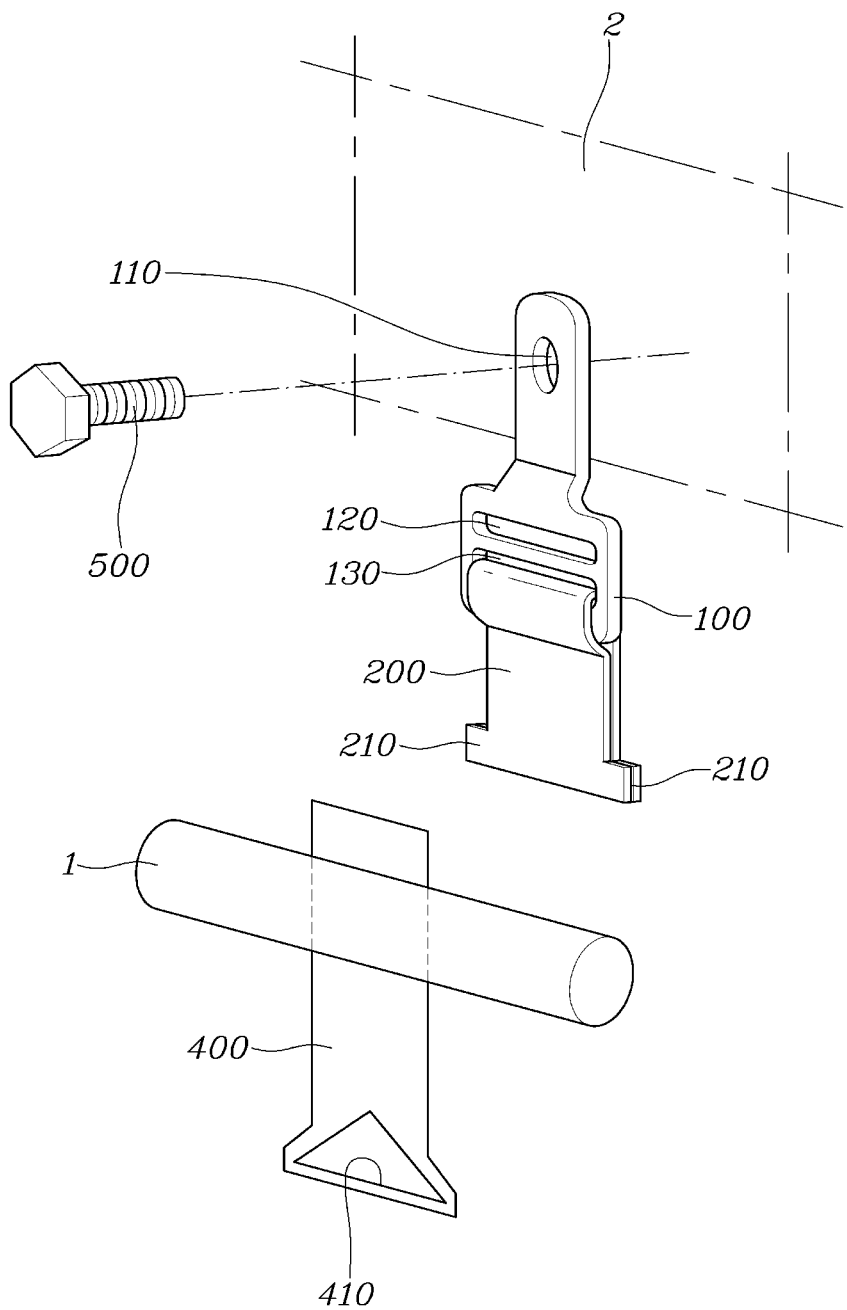
FIG. 3 is a disengaged view showing an apparatus for mounting a curtain airbag cushion according to the present invention.
Figure 4:
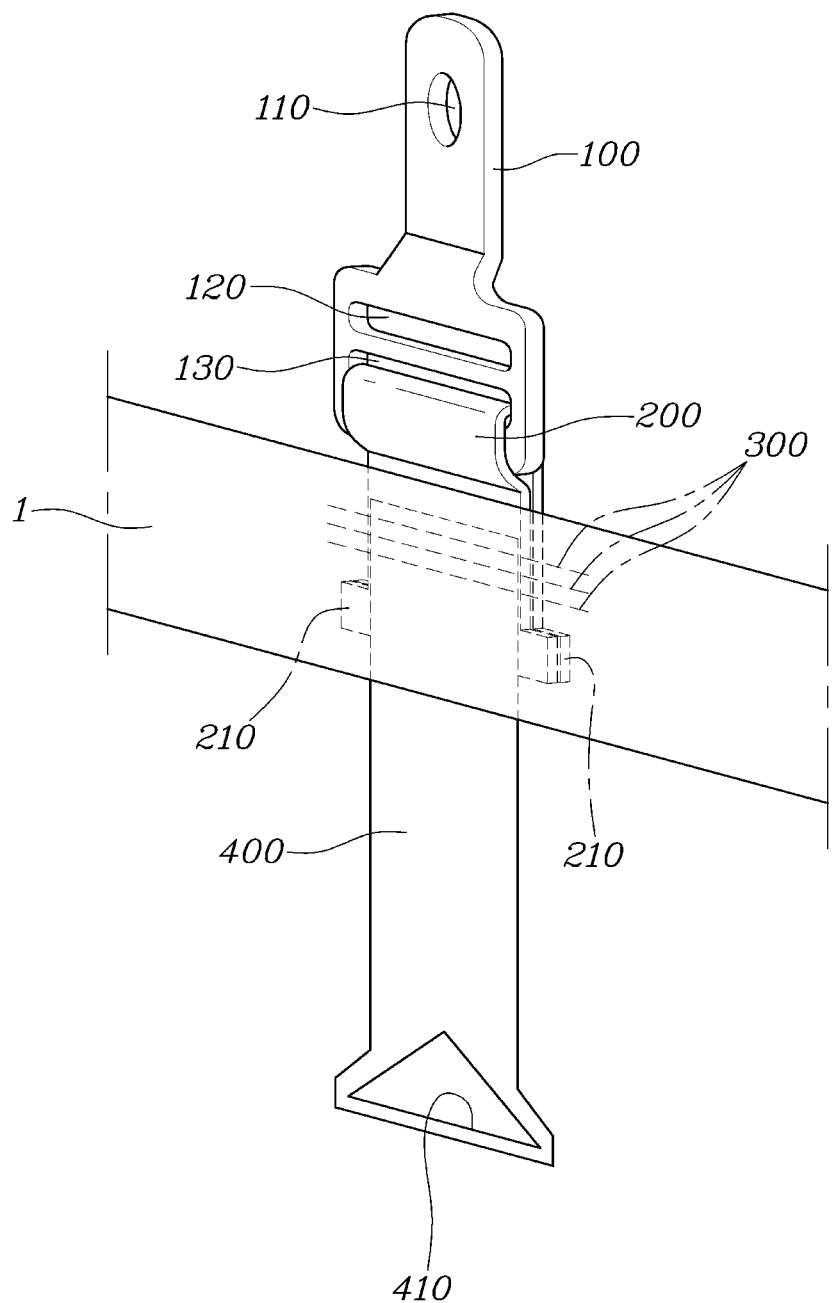
FIG. 4 is a view showing the curtain airbag cushion, an intermediate connection tap and a first end of a strap in a sewn state according to the present invention.
Figure 5:
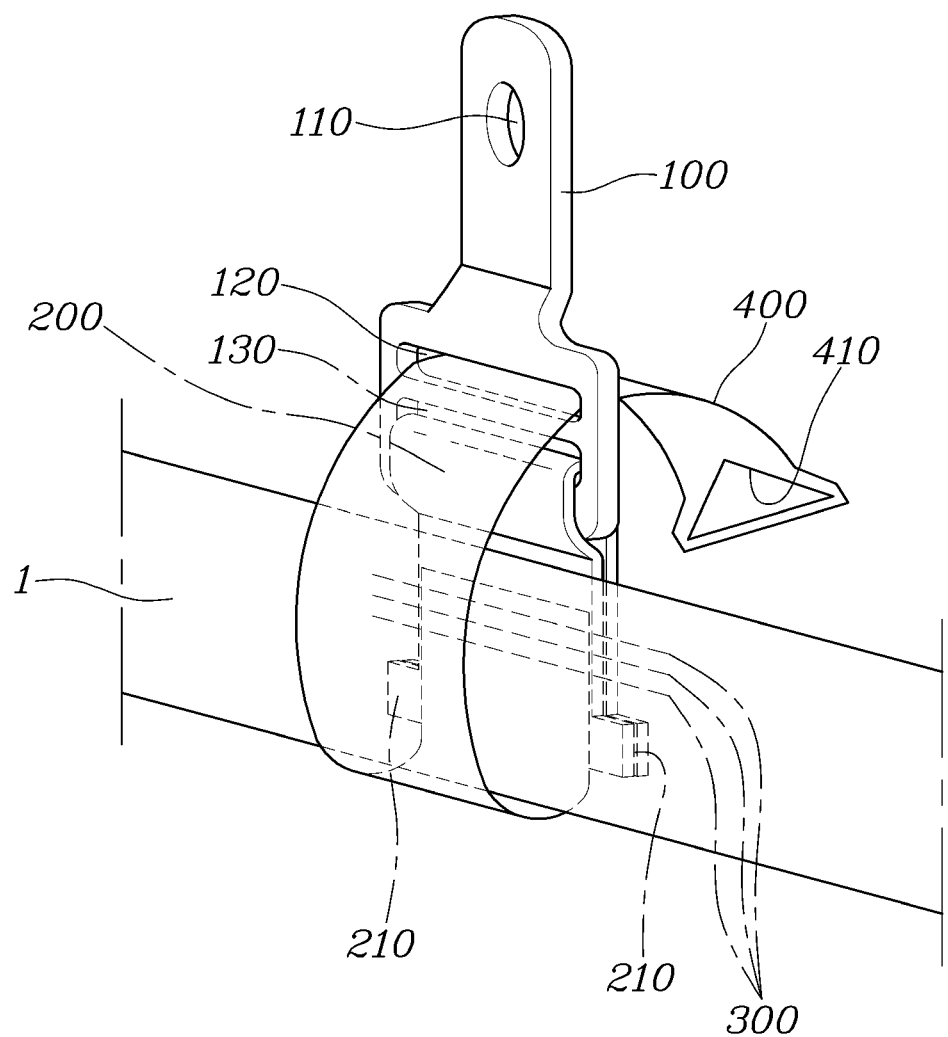
FIG. 5 is a view showing the strap shown in FIG. 4 that wraps the curtain airbag cushion and then passes through the intermediate connection tap.
Figure 6:
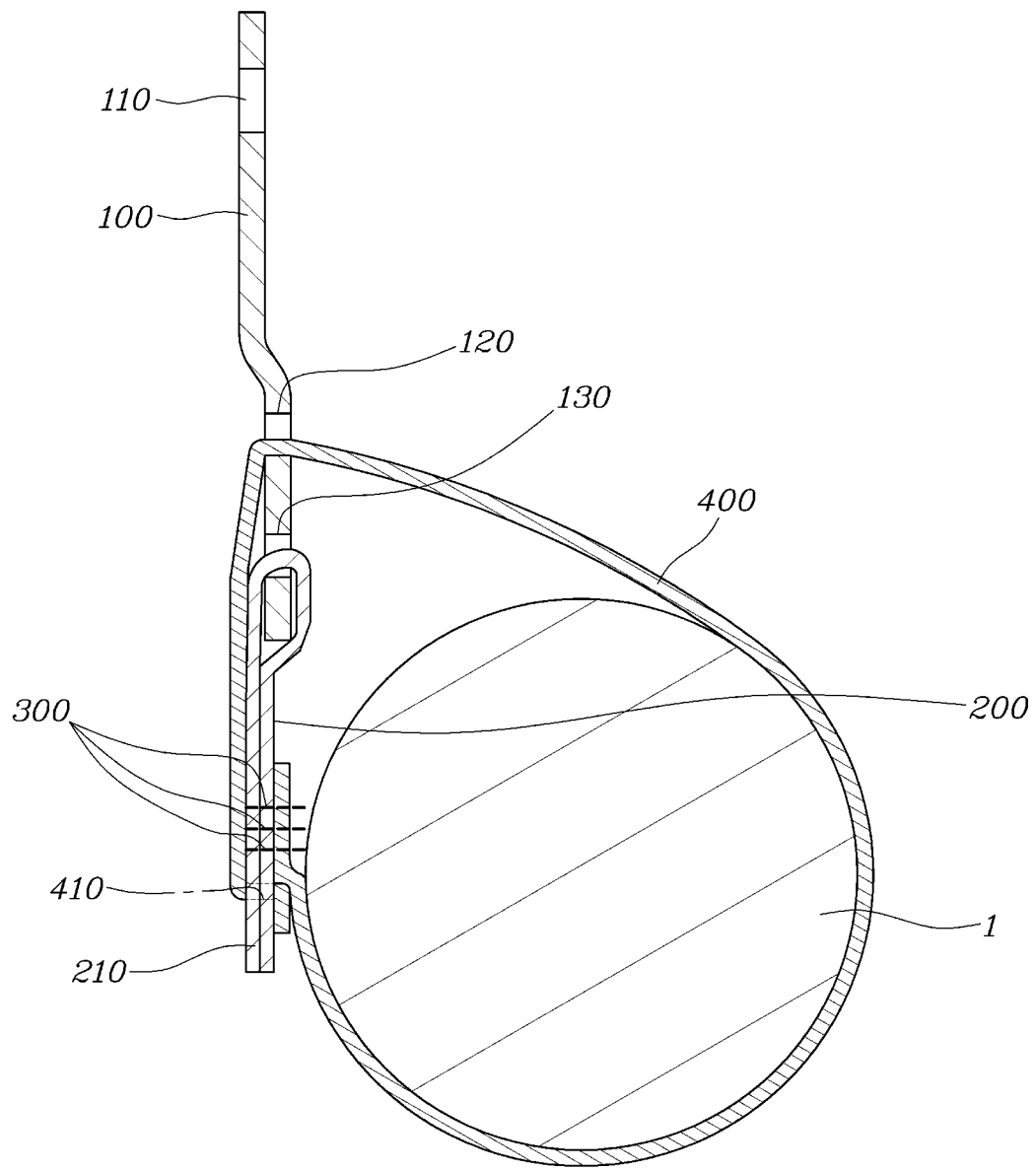
FIG. 6 is a view showing the strap of which a second end penetrating the intermediate connection tap is fixed by being caught by the intermediate connection tap.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

A controller according to an exemplary embodiment of the present invention may be implemented by a nonvolatile memory (not shown), which consists of an algorithm configured to control operations of various components of a vehicle or data regarding software instructions to play the algorithm, and a processor (not shown), which is configured to perform operations described below using the data stored in the memory. The memory and processor may be implemented as separate chips. Alternatively, the memory and processor may be implemented as single chips integrated with each other. The processor may take the form of one or more processors.

Hereinbelow, an apparatus for mounting a curtain airbag cushion according to an exemplary embodiment of the present invention will be described with reference to accompanying drawings.

A curtain airbag apparatus of a vehicle includes an inflator generating airbag gas, and a curtain airbag cushion unfolded by receiving the airbag gas.

The inflator and the curtain airbag cushion are provided to be located at an upper vehicle body at a pillar part of the vehicle. When the curtain airbag apparatus is operated, the curtain airbag cushion is unfolded downward and protects an occupant.

When the curtain airbag cushion is mounted to the upper vehicle body at the pillar part of the vehicle, an apparatus for mounting a curtain airbag cushion according to the present invention will be used.

In other words, as shown in FIGS. 3 to 7, the apparatus for mounting a curtain airbag cushion according to the present invention includes: a mounting plate 100 securely coupled to a vehicle body 2; an intermediate connection tap 200 coupled to the mounting plate 100; and a strap 400 the curtain airbag cushion 1 in a folded state, the curtain airbag cushion 1 being round rolled, in a circumferential direction of the curtain airbag cushion 1, and of which a first end is coupled to both the curtain airbag cushion 1 and the intermediate connection tap 200 by sewing 300 and a second end passes through the mounting plate 100 and then is fixed by being caught by the intermediate connection tap 200.

The mounting plate 100 is securely coupled to the vehicle body 2 by a medium of a bolt 500 penetrating an upper portion thereof, and in order to achieve the above structure, the mounting plate 100 has a bolt hole 110 at an upper end thereof for the bolt 500 to pass therethrough.

Furthermore, the mounting plate 100 is preferably made of a steel material in order to prevent sagging generated by weights of the intermediate connection tap 200, the strap 400, and the curtain airbag cushion 1.

When the mounting plate 100 is made of a steel material, sufficient assembly torque may be maintained when the mounting plate 100 is securely mounted to the vehicle body 2 by a medium of the bolt 500, so that a coupling force between the mounting plate 100 and the vehicle body 2 may be strengthened. Therefore, a problem that the curtain airbag cushion 1 is separated from the vehicle body 2 may be improved.

Furthermore, when the mounting plate 100 is made of a steel material, sagging generated by the weights of the intermediate connection tap 200, the strap 400, and the curtain airbag cushion 1 may be prevented, thereby achieving the shape maintenance of the mounting plate 100. Therefore, it is possible to improve the assembly efficiency and workability of an operator in assembly of the mounting plate 100 to the vehicle body 2 by using the bolt 500.

Figure 7:
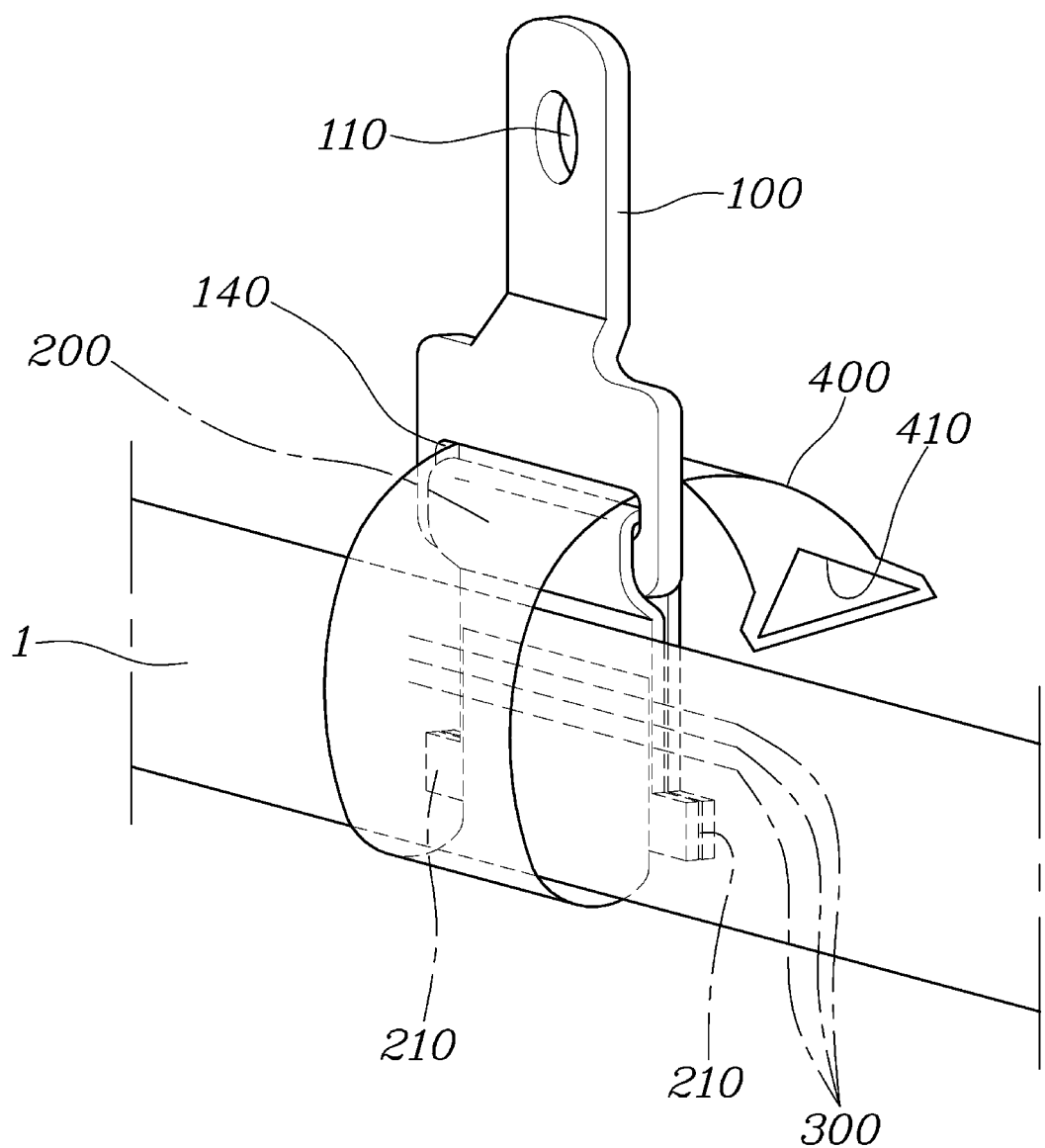
FIG. 7 is a view showing the mounting plate having one through hole through which both the intermediate connection tap and the strap pass together according to another embodiment of the present invention.

The mounting apparatus according to the present invention may be configured such that, as a first embodiment shown in FIGS. 3 to 6, the mounting plate 100 may have a first through hole 120 through which the strap 400 extends and a second through hole 130 through which the intermediate connection tap 200 extends that are vertically spaced apart from each other, or as a second embodiment shown in FIG. 7, the mounting plate 100 may have one through hole 140 through which both the intermediate connection tap 200 and the strap 400 extend together.

The intermediate connection tap 200 may be made of a flexible fabric material, and opposite ends of the intermediate connection tap 200 penetrating the second through hole 130 of the mounting plate 100 overlap each other, and a lower portion of the intermediate connection tap 200 is sewn to the curtain airbag cushion 1 and the first end of the strap 400 by sewing 300.

The strap 400 is made of a flexible fabric material. A first end of the strap 400 is inserted into a gap between the curtain airbag cushion 1 and the intermediate connection tap 200 and then is coupled to both the curtain airbag cushion 1 and the intermediate connection tap 200 by sewing 300. A second end of the strap 400 wraps the curtain airbag cushion 1 in the circumferential direction of the curtain airbag cushion 1 and then passes through the first through hole 120 of the mounting plate 100 and then is fixed by being caught by the intermediate connection tap 200.

A selvage portion of the curtain airbag cushion 1, the intermediate connection tap 200, and the first end of the strap 400 are coupled to each other to be integrated by sewing 300, and for sewing 300, both the intermediate connection tap 200 and the strap 400 may be preferably made of flexible fabric materials.

Furthermore, as both the intermediate connection tap 200 and the strap 400 are made of flexible fabric materials, in sewing 300 between the intermediate connection tap 200, the strap 400, and the curtain airbag cushion 1, the curtain airbag cushion 1 may be prevented from being damaged by the intermediate connection tap 200 and the strap 400.

As described above, the first end of the strap 400 is inserted into the gap between the curtain airbag cushion 1 and the intermediate connection tap 200. The first end of the strap 400 may be coupled to the curtain airbag cushion 1 and the intermediate connection tap 200 in an order of the curtain airbag cushion 1, the first end of the strap 400, and the intermediate connection tap 200 by sewing 300.

As another embodiment, the first end of the strap 400 overlaps to a rear surface of the intermediate connection tap 200 and may be coupled to the curtain airbag cushion 1 and the intermediate connection tap 200 in an order of the curtain airbag cushion 1, the intermediate connection tap 200, and the first end of the strap 400 by sewing 300.

A hook or blocking part 210 protruding opposite sides thereof is provided at a lower end of the intermediate connection tap 200, and a blocking hole 410 is formed in the second end of the strap 400 to catch the blocking part 210 passing therethrough.

The first end of the strap 400 is coupled to both the curtain airbag cushion 1 and the intermediate connection tap 200 by sewing 300. The second end of the strap 400 wraps the curtain airbag cushion 1 in the circumferential direction of the curtain airbag cushion 1 and then passes through the first through hole 120 of the mounting plate 100 and then protrudes rearward from the intermediate connection tap 200. The second end of the strap 400 protruding rearward from the intermediate connection tap 200 has the blocking hole 410. When the lower end of the intermediate connection tap 200 passes through the blocking hole 410, the blocking part 210 of the intermediate connection tap 200 is caught in the blocking hole 410 of the strap 400. Therefore, the second end of the strap 400 is caught by the blocking part 210 of the intermediate connection tap 200 so that the strap 300 is fixed.

Instead of the blocking part 210 protruding toward the opposite ends at the lower end of the intermediate connection tap 200, the intermediate connection tap 200 may be configured to form a cut portion by partially cutting a rear surface of the lower end of the intermediate connection tap 200 in a U shape so that the cut portion serves as the same catching structure as the blocking part 210.

As described above, the apparatus for mounting a curtain airbag cushion according to the embodiment of the present invention includes the intermediate connection tap 200 coupled to the curtain airbag cushion 1 by sewing 300, the strap 400, and the mounting plate 100 coupled to the intermediate connection tap 200 and securely coupled to the vehicle body 2. As the mounting plate 100 is made of a steel material, it is possible to maintain sufficient assembly torque when the mounting plate 100 is securely assembled to the vehicle body 2 by a medium of the bolt 500. Accordingly, a coupling force between the mounting plate 100 and the vehicle body 2 is strengthened, so that a problem that the curtain airbag cushion 1 is separated from the vehicle body 2 can be improved.

Furthermore, the mounting plate 100 made of a steel material, so that the present invention has advantages in which sagging generated by the weights of the intermediate connection tap 200, the strap 400, and the curtain airbag cushion 1 may be prevented. Therefore, the shape maintenance of the mounting plate 100 is achieved, and it is possible to improve the assembly efficiency and workability of the operator in assembly of the mounting plate 100 to the vehicle body 2 by using the bolt 500.

Furthermore, the intermediate connection tap 200 and the strap 400 are made of flexible fabric materials so as to be coupled to the curtain airbag cushion 1 by sewing 300. Therefore, in sewing 300, it is possible to prevent the curtain airbag cushion 1 from being damaged by the intermediate connection tap 200 and the strap 400.

Although the preferred embodiments of the present invention have been disclosed for illustrative purposes, those skilled in the art will appreciate that various modifications, additions, and substitutions are possible, without departing from the spirit and scope of the present invention.

What is claimed is:

1. An apparatus for mounting a round-rolled curtain airbag cushion to a vehicle body, the apparatus comprising:
   a mounting plate configured to be coupled to the vehicle body;
   an intermediate connection tap coupled to the mounting plate; and
   a strap configured to wrap around the curtain airbag cushion, the strap extending through the mounting plate and having (1) a first end sewn together with the curtain airbag cushion and the intermediate connection tap and (2) a second end attachable to the intermediate connection tap,
   wherein the second end of the strap is attached to the intermediate connection tap such that a portion of the strap between the first and second ends wraps around the curtain airbag cushion.

2. The apparatus of claim 1, wherein the mounting plate comprises steel and has an upper portion configured to be coupled to the vehicle body by a bolt connection.

3. The apparatus of claim 1, wherein the mounting plate has a through hole, and the intermediate connection tap and the strap extend through the through hole.

4. An apparatus for mounting a round-rolled curtain airbag cushion to a vehicle body, the apparatus comprising:
   a mounting plate configured to be coupled to the vehicle body;
   an intermediate connection tap coupled to the mounting plate; and
   a strap configured to wrap around the curtain airbag cushion and extending through the mounting plate, the strap having (1) a first end sewn together with the curtain airbag cushion and the intermediate connection tap and (2) a second end configured to engage the intermediate connection tap,
   wherein the mounting plate has first and second through holes vertically spaced apart from each other,
   wherein the strap extends through the first through hole of the mounting plate, and
   wherein the intermediate connection tap extends through the second through hole of the mounting plate.

5. The apparatus of claim 4, wherein:
the intermediate connection tap comprises a flexible fabric material,
both ends of the intermediate connection tap overlap each other, and
a portion of the intermediate connection tap positioned below the second through hole is sewn together with the curtain airbag cushion and the first end of the strap.

6. The apparatus of claim 4, wherein:
the strap comprises a flexible fabric material,
the first end of the strap is positioned between the curtain airbag cushion and the intermediate connection tap, and
the second end of the strap is configured to wrap the curtain airbag cushion in the circumferential direction thereof and then penetrate the first through hole of the mounting plate and is fixed by being caught by the intermediate connection tap.

7. The apparatus of claim 6, wherein:
the intermediate connection tap has a lower end portion at which a hook part is positioned, and
the second end of the strap has a connection hole configured to engage the hook part of the intermediate connection tap.

\* \* \* \* \*